United States Patent [19]

Appelman et al.

[11] 4,063,035

[45] Dec. 13, 1977

[54] DEVICE FOR VISUALLY DISPLAYING THE AUDITORY CONTENT OF THE HUMAN VOICE

[75] Inventors: Dudley Ralph Appelman; David Allen Link; Gerald Louret Stout, all of Bloomington, Ind.

[73] Assignee: Indiana University Foundation, Bloomington, Ind.

[21] Appl. No.: 741,464

[22] Filed: Nov. 12, 1976

[51] Int. Cl.² .............................................. G10L 1/12
[52] U.S. Cl. ................................................. 179/1 SP
[58] Field of Search .......................... 179/1 SP, 1 SA

[56] References Cited

U.S. PATENT DOCUMENTS

| 2,137,888 | 11/1938 | Fuller | 179/1 SP |
|---|---|---|---|
| 2,602,836 | 7/1952 | Foster | 179/1 SP |
| 3,611,411 | 10/1971 | Moshier | 179/1 SP |

Primary Examiner—Kathleen H. Claffy
Assistant Examiner—E. S. Kemeny
Attorney, Agent, or Firm—Kirkland & Ellis

[57] ABSTRACT

A voiced-sound frequency analysis and display system displays two forms of spectral information about the signal: (1) the first and second formants as a point on an X-Y grid of a cathode ray tube, and (2) the full spectrum as a bar graph on an oscilloscope. Two sets of filters with associated circuitry perform the analysis. A scanning (peak hunting) second-formant selector circuit is also disclosed.

17 Claims, 19 Drawing Figures

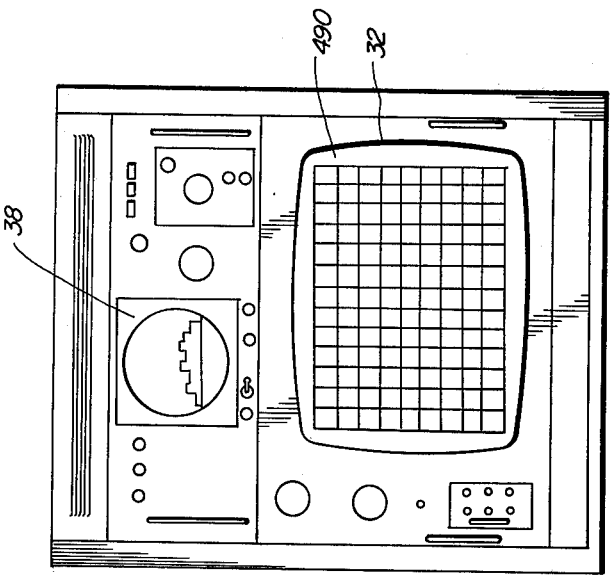

DEVICE FOR VISUALLY DISPLAYING THE AUDITORY CONTENT OF THE HUMAN VOICE

BACKGROUND OF THE INVENTION

1. Field of the Invention

The present invention relates to formant tracking devices, and more particularly to devices for visually displaying the formant content of spoken or sung vowel sounds.

2. Description of the Prior Art

The complex act of singing demands the singer to coordinate the sensations experienced within the psychological functions of respiration, phonation, resonation, and articulation to a disciplined vocal utterance that is directly related to language. Controlled by aesthetic and social mores which vary with geographic locality, the teaching of this linguistic function embodies the psychological judgment of sensation both by teacher and student, which is a highly subjective process of problem solving. Such subjectivity creates numerous systems of basic teaching which are successful within a music-social environment, but tend to be terminal because all cues for control of the vocal utterance are based upon highly personal teacher directive rather than scientific fact.

Every directive given by the teacher and every decision made by the student concerning his choice in control of his vocal utterances is determined by auditory feedback. The deaf cannot communicate in speech nor song because of this required aural awareness. There is no instrument presently available which will provide instantaneous, objective visual verification of auditory judgment that is directly related to language.

Vowels are recognized and measured by their formants. Formants are the areas of greatest acoustic energy within the vocalized sound spectrum. They are created by cavity resonances within the phonatory tract. Classic belief holds that auditory differentiation between vowel sounds is dependent upon the frequency placement of the first two of these energy concentrations, i.e., the first two formants in the vocal spectrum. Visual verification of auditory judgment is dependent upon the location of those two points of energy plotted on a two-dimensional graph displayed visually by some means such as a cathode ray tube.

To establish objective visual verification of auditory judgment used by both the student and teacher in the act of singing or pronouncing words, an electronic instrument capable of providing visual indication of auditory differentiation would be a highly desirable advance in the art. The present invention is believed to meet those needs.

BRIEF DESCRIPTION OF THE INVENTION

A device for visually displaying the auditory content of the human voice comprises input means for receiving human voice utterances and for converting the auditory content of the voice utterances to electrical signals related to the first and second formant frequencies. A first set of filter means covering a first formant frequency range of a frequency spectrum of the human voice utterances is provided for separating the electronic auido signal into a first set of individual frequency signals. A second set of filter means covering a second formant frequency range of the frequency spectrum of the human voice utterances is provided for separating the electronic audio signal into a second set of individual frequency signals. A first comparator means is provided for comparing the first set of individual frequency signals and selecting and transmitting the individual frequency signal of the first set having the greatest magnitude. A second comparator means is provided for comparing the second set of individual frequency and selecting and transmitting the individual frequency signal of the second set having the greatest magnitude. A first converter means is provided for converting the selected individual frequency signal from the first comparator means to a voltage representative of the frequency of the selected frequency signal of the first set. A second converter means is provided for converting the selected individual frequency signal from the second comparator means to a second voltage representative of the frequency of the selected frequency signal of the second set. A display means is provided including a cathode ray tube having a vertical input and a horizontal input. The first voltage from the first converter means is applied to the vertical input and the second voltage from the second converter means is applied to the horizontal input so that a luminescent dot appears on the face of the cathode ray tube at a position corresponding to the values of the first and second voltages.

In addition, means may be provided for displaying in bar graph form the respective amplitudes of the individual frequency signals of the first and second sets of individual frequency signals. Also, a scanning selector means may be provided for scanning the second set of individual frequency signals, selecting the highest frequency peak signal and causing that peak signal to be transmitted. Further, means may be provided for rendering the display means inoperative in the absence of the input means receiving human voice utterances.

Accordingly, it is a primary object of the present invention to provide a device for permitting visual determination of the auditory content of human voice utterances, particularly sung vowel sounds over a wide pitch range.

It is a further object of the present invention to provide a device which may be used by the deaf or hard of hearing to permit visual identification of the auditory content of the voice.

It is a further object of the present invention to provide a device which permits instantaneous visual feedback to a student of the proper articulation of voice utterances.

These and other objects, advantages, and features of the present invention will hereinafter appear, and for the purposes of illustration, but not of limitation, an exemplary embodiment of the present invention is illustrated in the accompanying drawings.

DESCRIPTION OF THE DRAWINGS

FIG. 16 is a front view of the display panel of the present invention.

FIG. 17 is a diagram showing the arrangement of FIGS. 2-6.

FIG. 18 is an enlarged view of an oscilloscope tube showing the spectrum bar display.

FIG. 19 is an enlarged view of the cathode ray tube face showing the representative positions of various vowel sounds.

DETAILED DESCRIPTION OF THE PREFERRED EMBODIMENT

Figure 1:
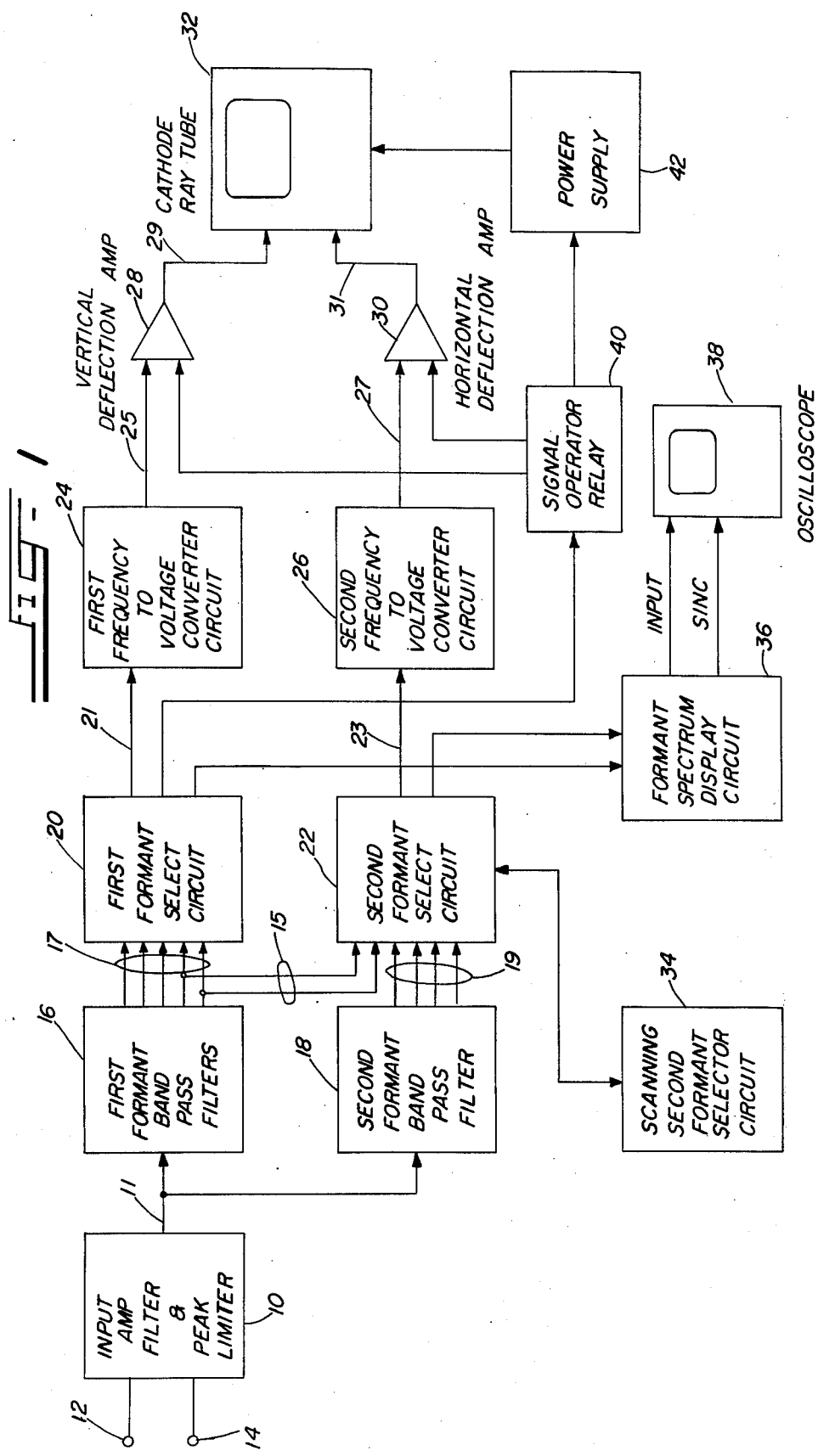
FIG. 1 is a block diagram of the present invention.

With reference to FIG. 1, a block diagram of the present invention is illustrated. An input amplifier, filter, and peak limiter circuit 10 has a high level input 12 for connection to a tape recorder or similar high level device, and a low level input 14 for connection to a low level device such as a microphone. Assuming an input on low level input 14, a sung vowel sound is converted to an electronic audio signal by a microphone and applied to the input amplifier, filter, and peak limiter 10. The audio signal is amplified, filtered to remove the fundamental frequency, and the upper limit of the signal limited by a peak limited circuit. The output from the input amplifier, filter, and peak limiter 10 is fed in parallel by conductor 11 to a first set of formant band pass filters 16 covering a first formant range of approximately 270 Hz to 1000 Hz, and a second set of band pass filters 18 covering a second formant range of approximately 630 Hz to 3300 Hz. The audio signal is divided into a first set of frequency signals in the first formant range, each signal in the set covering approximately ⅓ octave, by the first set of filters 16, and the audio signal is divided into a second set of frequency signals in the second formant range, each signal in the set covering approximately ⅓ octave, by the second band pass filters 18. The first set of frequency signals are fed by conductors 17 to the first formant select circuit 20, and the second set of frequency signals are fed by conductors 19 to the second formant select circuit 22. Two conductors 15 are fed the highest two frequency signals from the first set of band pass filters to the second formant select circuit 22. The first and second formant select circuits 20 and 22 select an input frequency signal from the first and second band pass filters respectively having the greatest amplitude. The selected signals are then respectively fed by conductors 21 and 23 to the first frequency to voltage converter circuit 24 and the second frequency to voltage converter circuit 26. These circuits 24 and 26 convert the respective selected signals to a voltage representative of the frequency of each of the selected signals. The voltage from the first frequency to voltage converter circuit 24 is fed by conductor 25 to a vertical deflection amplifier 28 and the voltage from the second frequency to voltage converter circuit 26 is fed by conductor 27 to a horizontal deflection amplifier 30. The outputs from the deflections amplifiers 28 and 30 are then applied by conductors 29 and 31 to a cathode ray tube so that a luminescent dot appears on the screen of the cathode ray tube at a position corresponding to the values of the respective voltages from the first and second frequency to voltage converter circuits 24 and 26. The position of this luminescent dot is representative of the frequency content of the dominant first and second formant frequencies selected by the first and second formant select circuits 20 and 22. Consequently, the vertical and horizontal position of the luminescent dot is representative of the auditory content of the vowel sound.

An alternate method of selecting the second formant frequency signal for display is provided by the scanning second formant selector circit 34. This circuit essentially scans (in a manner more fully described later) for the highest frequency peak signal in the second set of frequency signals, and when the highest peak frequency signal is detected, a logic signal is provided to the second formant select circuit 22 which causes that signal to be passed to the second frequency to voltage converter circuit 26.

A formant spectrum display circuit 36 is also provided to permit the visual display on oscilloscope 38 of the amplitudes of the respective frequency signals provided by the band pass filters. The formant spectrum display is essentially a multi-channeled, time division mutiplexer, the serial output of which is fed to the vertical input of the oscilloscope 38 in a manner more fully described below.

In order to keep the screen of the cathode ray tube 32 from being burnt by the electron beam when no input signal is present, a signal operated relay 40 controls the power supply 42 to the cathode ray tube 32 to turn the electron beam on and off depending upon the presence of an input signal. Also, signal operated relay 40 controls deflection amplifiers 28 and 30 to effectively ground their inputs when no usable signal is present so that room and circuit noise do not cause these amplifiers to continuously operate and heat up.

Figure 2:
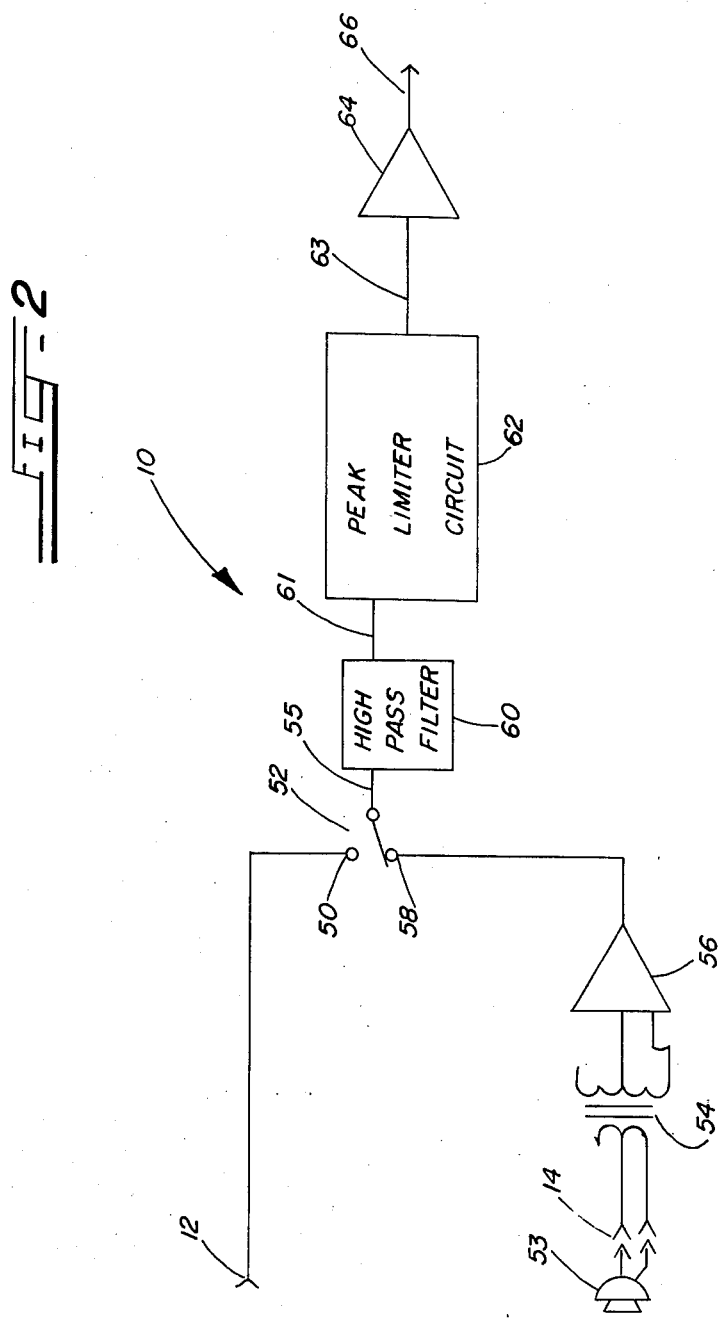
FIG. 2 is a more detailed block diagram of the input amplifier, filter, and peak limiter of the present invention.

With reference to FIG. 2, a more detailed block diagram of the input amplifier, filter, and peak limiter circuit 10 is illustrated. High level input 12 is connected to one contact 50 of a selector switch 52. Low level input 14 is connected to one side of an input transformer 54, and the other side of input transformer 54 is connected to a preamplifier 56. A microphone 53 or other low level sound transducer may be connected to low level input 14 so that an electronic audio signal representative of the input sound (e.g., a sung vowel) is applied to preamplifier 56. The output of preamplifier 56 is connected to contact 58 of selector switch 52. Selector switch 52 is connected by conductor 55 to a 270 Hz high pass filter 60 which acts to filter out the fundamental frequency of the input electronic audio signal representative of the sung vowel sound. The output from the high pass filter 60 is applied by conductor 61 to peak limiter circuit 62 which limits the amplitude of its audio signal at the output of peak limiter circuit 62 before it is applied by conductor 63 to amplifier 64 which further amplifies the audio signal.

Figure 3:
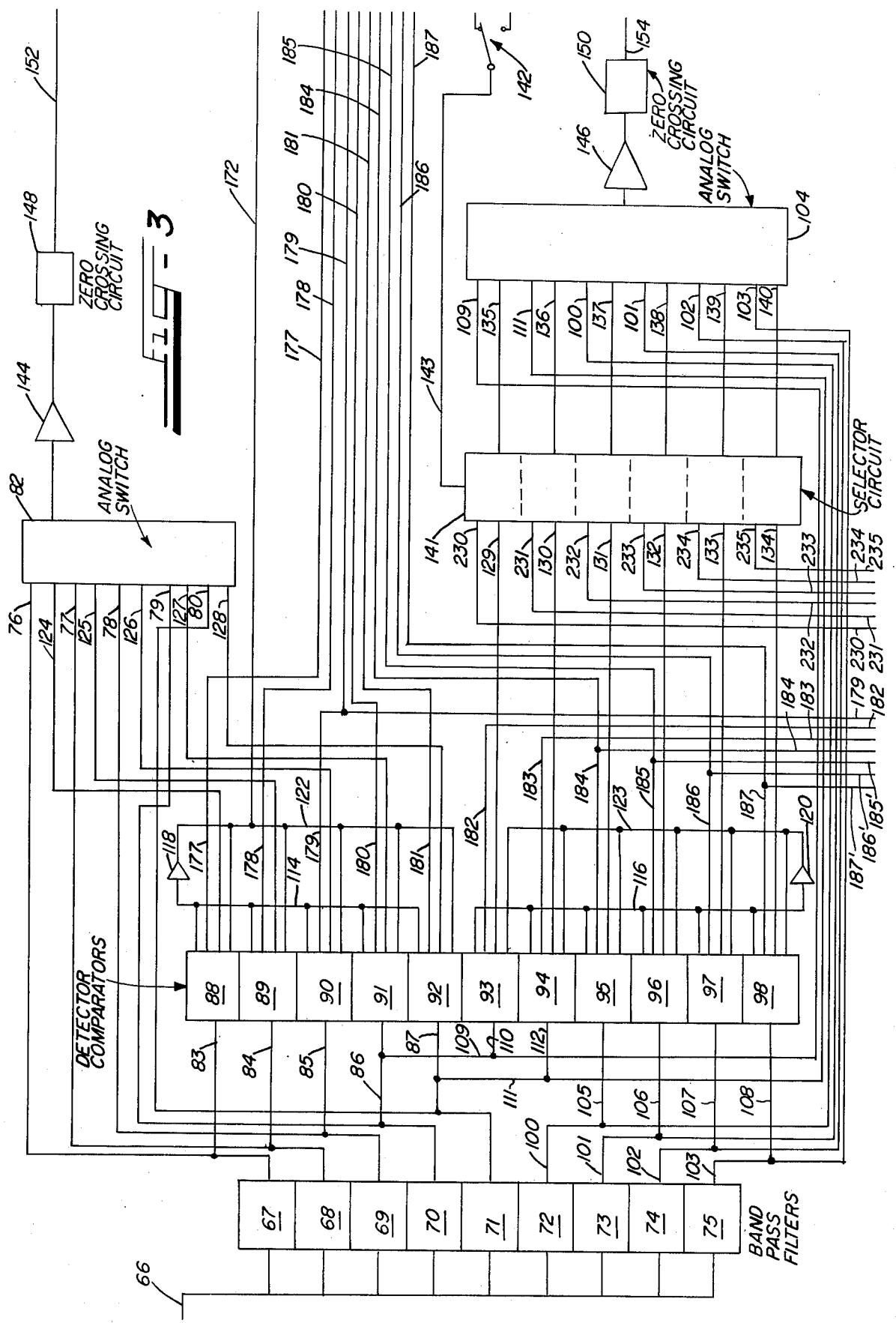
FIG. 3 is a more detailed block diagram of the first and second formant band pass filters and the first and second formant select circuits of the present invention.

With reference to FIG. 3, the output audio signal from the amplifier 64 on conductor 66 is applied in parallel to nine separate band filters 67, 68, 69, 70, 71, 72, 73, 74, and 75. Each of the band pass filters 67–74 are ⅓ octave wide and band pass filter 75 is approximately ⅔ octave wide. The cut off frequencies were selected such that there are no omissions in the spectrum from approximately 270 Hertz to approximately 3300 Hertz. The output of each of band pass filters 67, 68, 69, and 70, and 71 are connected by conductors 76, 77, 78, 79, and 80 to analog switch 82. Analog switch 82 is a conventional field effect transistor (FET) analog switch whose purpose and function will be hereinafter more fully described. The output of band pass filter 67, 68, 69, 70, and 71 are also connected in parallel by conductors 83, 84, 85, 86 and 87 to detector-comparator circuits 88, 89, 90, 91, and 92 respectively.

Similarly, band pass filters 72, 73, 74, and 75 are each respectively connected by conductors 100, 101, 102, and 103, to analog switch 104. Band pass filters 70 and 71 are also connected to analog switch 104 respectively by conductors 79, 86 and 109, and conductors 80, 87 and 111. The outputs of band pass filters 72, 73, 74, and 75 are also connected in parallel by conductors 105, 106, 107, and 108 to detector-comparator circuits 95, 96, 97, and 98 respectively. The output of band pass filter 70 is also connected through conductors 79, 86, 109, and 110 to detector-comparator circuit 93, Similarly, band pass filter 71 is also connected through conductors 80, 87, 111, and 112 to detector-comparator circuit 94. Band pass filters 70 and 71 cover a portion of the spectrum in which the first and second formant ranges overlap. Thus, the output from band pass filters 70 and 71 are each respectively connected in parallel to detector comparators 91 and 93, and 92 and 94 respectively.

Detector-comparator circuits 88, 89, 90, 91 and 92 form a first set of detector-comparators, for the first formant range of approximately 270 to 1000 Hz, and detector comparator circuits 93, 94, 95, 96, 97, and 98 form a second set of detector-comparators for the second formant range of approximately 630 to 3300 Hz. Band pass filters 67, 68, 69, 70, and 71 correspond to the first formant band pass filters 16 in FIG. 1, and band pass filters 72, 73, 74, and 75 correspond to the second formant band pass filters 18 in FIG. 1. Similarly, detector comparators 88, 89, 90, 91, and 92 and analog switch 82 correspond to the first formant select circuit 20 in FIG. 1 and detector comparator circuits 93, 94, 95, 96, 97, and 98 and analog switch 104 correspond to second formant select circuit 22 in FIG. 1. Conductors 76–80 correspond to conductors 17 in FIG. 1, conductors 100–103 correspond to conductors 19 in FIG. 1, and conductors 109 and 111 correspond to conductors 15 in FIG. 1.

Each of the detector-comparator circuits 88–98 rectifies the input signal from a respective band pass filter 67–75 to provide a DC signal representative of the magnitude of the input signal from each of the respective band pass filters 67–75. The DC signal of the greatest magnitude from detector-comparator circuits 88, 89, 90, 91 and 92 is applied to a buss conductor 114. Similarly, the DC signal of the greatest magnitude from detector-comparator circuits 93, 94, 95, 96, 97, and 98 is applied to a conductor buss 116.

Detector comparators 88–98 each contain a diode gate circuit (to be hereinafter more fully described) which permits only the DC signal from the respective detector-comparator circuit corresponding to the audio frequency signal of the greatest magnitude from band pass filters 67–75 to be applied to buss conductors 114 and 116, respectively. The respective DC signals on each of conductors 114 and 116 are respectively applied to buffer amplifiers 118 and 120 which buffer and isolate the DC signal. Buffer amplifier 118 feeds the respective DC signal back on a buss conductors 122 to each of detector-comparators 88–92. Buffer amplifier 120 feeds the respective DC signal back on buss conductor 123 to each of detector-comparators 93–98. Detector comparators 88–98 each contain a comparator circuit which compares the DC signal fed back with the rectified input signal from its respective band pass filter, and the particular detector comparator circuit 88–98 which has a rectified input signal equal to or greater than the feedback signal on conductors 122 and 123 supplies a DC logic signal on one of conductors 124, 125, 126, 127, 128, to analog switch 82 and on conductors 129, 130, 131, 132, 133, and 134 to selector circuit 141. Selector circuit 141 is connected to selector switch 142 by conductor 143. With the selector switch 142 in the position illustrated in FIG. 3, selector circuit 141 operates to allow the signal present on any of conductors 129–134 to be passed through to conductors 135–140 respectively to analog switch 104. With select switch 142 in the opposite position from that shown in FIG. 3, the signal applied to analog switch 104 is selected by the scanning second formant selector circuit 34 (to be hereinafter more fully described).

Detector-comparator circuits 88–98 provide logic signals to the analog switches 82 and 104 corresponding to the band pass filter in each of the formant ranges having the greatest energy level. These logic signals control analog switches 82 and 104 so that only the particular frequency signal from the band pass filters 67–75 corresponding to the highest energy level in each of the formant ranges is allowed to be conducted through analog switches 82 and 104 to the output of each respective switch. For example, assuming that band pass filter 68 and 73 each respectively have the largest magnitude output signal in each of the two formant ranges, detector comparators 89 and 96 each respectively would apply a DC logic signal on conductors 125 and 132, 138 respectively to analog switches 82 and 104. With these input logic signals, only the output frequency signal from band pass filter 68 on conductor 77 and band pass filter 73 on conductor 101 would be passed on to the output of analog switches 82 and 104 respectively. The output signal from analog switches 82 and 104 are each respectively applied to an amplifier 144 and 146 respectively, and the output of amplifiers 144 and 146 are each respectively applied to a zero crossing circuit 148 and 150. Zero crossing circuits 148 and 150 each comprise a Schmitt trigger circuit which provides at the output of zero crossing circuits 148 and 150 an output square wave signal at a frequency corresponding to the input frequency to each of the zero crossing circuits 148 and 150 respectively. The output of zero crossing circuits 148 and 159 are applied on conductors 152 and 154 respectively to monostable multivibrators 156 and 158 respectively in FIG. 4. Monostable multivibrators 156 and 158 are one shot multivibrators which generate a constant width pulse, the period of which is dependent on the frequency of the input square wave pulses on conductors 152 and 154 respectively. These constant energy pulses from multivibrators 156 and 158 are respectively integrated by integrators 160 and 162 respectively to provide integrated average output signals the value of which are proportional to the input frequency is on conductors 152 and 154 respectively. These respective integrated signals are amplified by amplifiers 164 and 166 respectively and applied to vertical deflection amplifier 28 and horizontal deflection amplifier 30. The output of the vertical and horizontal deflection amplifiers 28 and 30 drive conventional cathode ray tube deflection yokes 168 and 170 respectively to cause the electron beam in the cathode ray tube to be deflected to a position on the face of the tube corresponding to the values of the two input frequencies. This horizontal and vertical deflection represents the frequency of the two peak harmonics in each of the two formant ranges.

In order to keep the screen of the cathode ray tube 32 from being burnt when no signal is present, the signal operated relay 40 is connected by conductor 172 to the output buss conductor 122 of buffer amplifier 118. Thus, when there is an input signal, a DC voltage appears on buss conductor 122 and on conductor 172 which causes signal operated relay 40 to operate to turn on power supply 42 so that power is supplied to cathode ray tube 32 to produce an electron beam. When no signal is present, the power supply 42 turns off, and thereby turning off the electron beam of cathode ray tube 32. Conductors 174 and 176 are connected from the signal operated relay 40 to the vertical and horizontal deflection amplifiers to cause these amplifiers to turn on and off depending upon the input signal. This acts to remove the input when no usable signal, i.e., voice signal, is present at the input so that noise and other undesirable signals are precluded from causing the deflection amplifiers to supply current to the deflection yokes. This precludes damage to the deflection amplifier and unnecessary heating of the deflection yokes.

Figure 5:
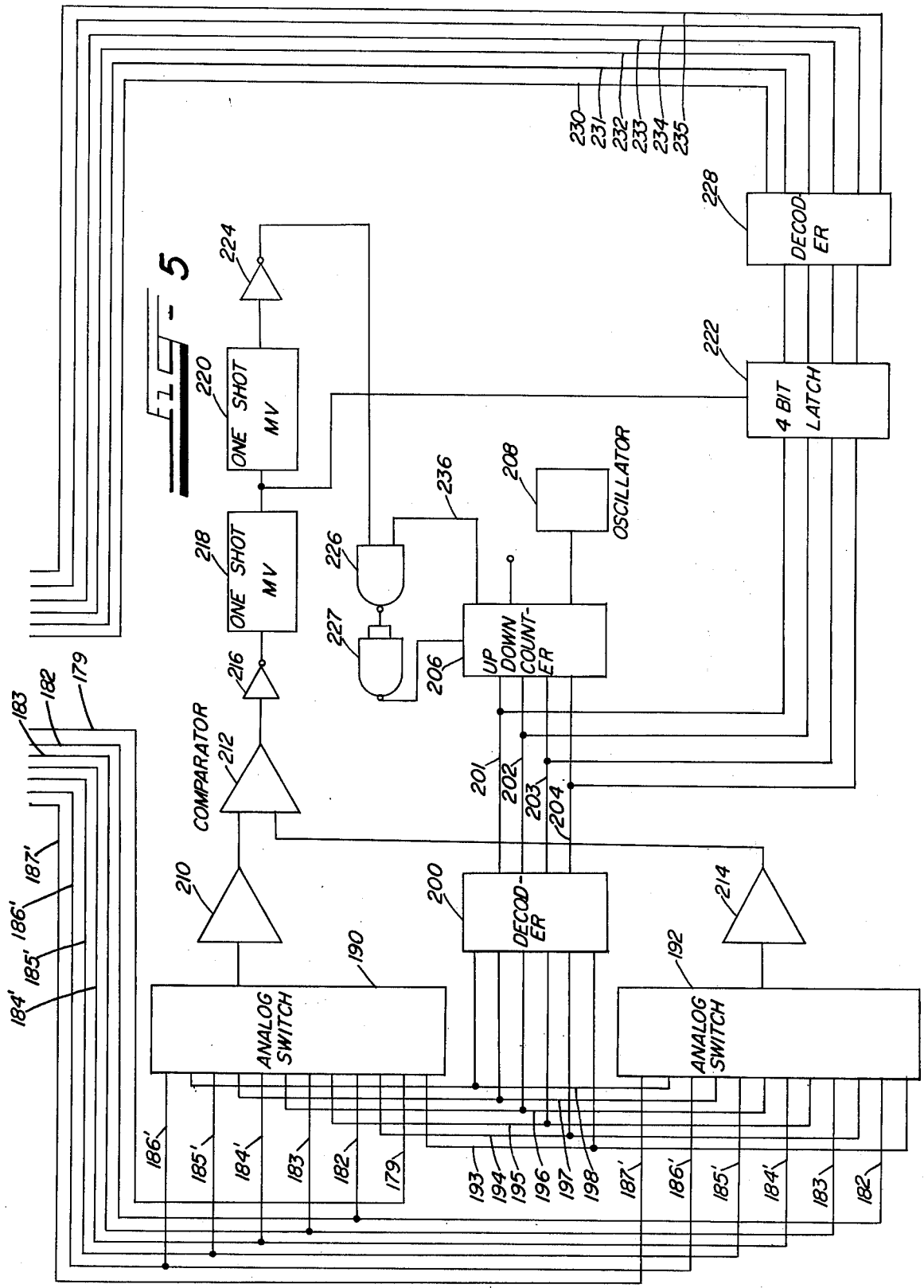
FIG. 5 is a more detailed block diagram of the scanning second formant selector circuit of the present invention.

With reference to FIGS. 3 and 5, the operation of the scanning second formant selector circuit will be more fully described. Appearing on each of conductors 177, 178, 179, 180, 181, 182, 183, 184, 185, 186, and 187 respectively connected to detector comparator circuits 88-98 is a DC signal representative of the magnitude of the input frequency signal to each of the detector comparators 88-98 from the band pass filters 67-75. Conductor 184′, 185′, 186′, and 187′ are respectively connected to conductors 184, 185, 186, and 187 and extend to FIG. 5. Similarly, conductors 179, 182, and 183 extend to FIG. 5. These conductors are connected in parallel to analog switches 190 and 192 respectively as illustrated. The DC logic inputs to each of analog switches 190 and 192 are connected in parallel to conductors 193, 194, 195, 196, 197, and 198. These conductors are respectively connected to the outputs of a decoder 200 which provides a series of DC logic signals on conductors 193-198 in time sequence. Decoder 200 decodes four-bit binary numbers supplied on conductors 201, 202, 203, and 204 from up-down counter 206. Up-down counter 206 is driven by a free running oscillator 208.

Assuming inputs on conductors 179-187′ to analog switches 190 and 192, decoder 200 in response to a binary input from counter 206 first provides a logic signal on conductor 198 which causes the signal present on conductor 186′ to be passed by analog switch 190 to amplifier 210 and then to one input of comparator 212. Similarly, the logic signal on conductor 198 allows the signal present on conductor 187′ to be connected by analog switch 192 to amplifier 214 and then to the other input of comparator 212. If the input to comparator 212 from amplifier 214 is less than the amplitude of the signal to comparator 212 from amplifier 210, comparator 212 does not operate to pass a logic signal. The decoder 200 then applies a logic signal on conductor 197 in response to counters 206 counting to the next binary number which passes the signals on conductors 186′ and 185′ through amplifiers 210 and 214 to comparator 212. If the output signal from amplifier 214 is greater than the output from amplifier 210, comparator 212 then operates to pass a logic signal to inverter 216 which in turn passes an inverted logic signal to one shot multivibrator 218. This causes one shot multivibrator 218 to operate to supply a logic signal to one shot multivibrator 220 and four bit latch 222. This causes one shot multibrator 220 to supply a logic signal to inverter 224 which in turn supplies an inverted logic signal to one input of NAND gate 226 causing NAND gate 226 to provide an output logic signal to NAND gate 227 which inverts the logic signal and supplies that signal to counter 206. This signal reloads up-down counter 206. The logic signal to four-bit latch 222 causes four-bit latch 222 to lock and hold the binary information contained on conductors 201-204 representative of the detector comparator channel having the peak signal. This binary information is conducted to a decoder 228 which decodes this information and provides a logic signal on one of conductors 230, 231, 232, 233, 234, 235 representative of which input channel has the peak amplitude frequency signal.

Four-bit latch 222 remains latched until a subsequent signal is received from one shot multivibrator 218. Accordingly, until a new peak signal is sensed, four-bit latch 222 remains in the same condition. If no peak signal is sensed, up-down counter 206 reaches the end of its count and provides a reload signal on conductor 236 to NAND gate 226 which causes the up-down counter 206 to reload and recommencement counting down.

Thus, as can be seen, the scanning second format selector circuit illustrated in FIG. 5 scans down from the highest frequency channel until it senses the highest frequency peak signal. In some human voices, there is a false frequency peak in the second formant region that may be of greater amplitude than the desired formant. It has been observed that the desired formant in such human voices is the highest frequency peak signal within the second formant range. Accordingly, by scanning down from the highest frequency, the first formant at the highest frequency can be found, and a signal corresponding to that formant channel can be conveyed on one of conductors 230-235 to the selector circuit 141 illustrated in FIG. 3. When the selector switch 142 in FIG. 3 is in the opposite position illustrated in FIG. 3, selector circuit 141 operates to pass a logic signal to analog switch 104 on one of conductors 135-140 corresponding to the selector peak formant signal. This logic signal on conductors 135-140 causes analog switch 104 to pass the frequency signal on one of the corresponding conductors 109, 111, 100, 101, 102, and 103 to the output of analog switch 104. This signal is treated in the same manner as previously described to ultimately provide a voltage signal to the deflection yoke of the cathode ray tube indicative of the frequency of that formant.

Figure 4:
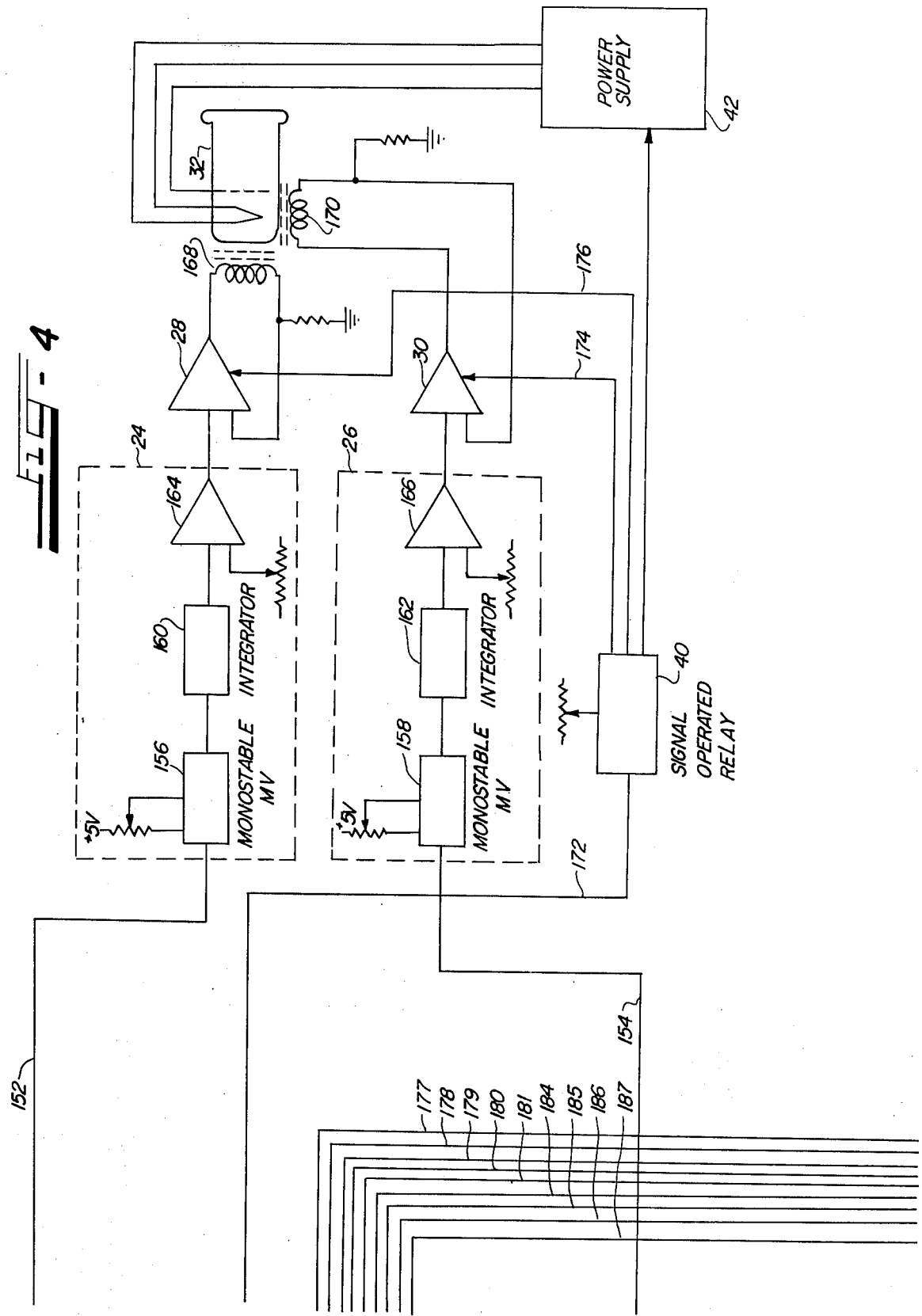
FIG. 4 is a more detailed block diagram of the frequency to voltage converter circuits, the vertical and horizontal deflection amplifiers, and cathode ray tube of the present invention.
Figure 6:
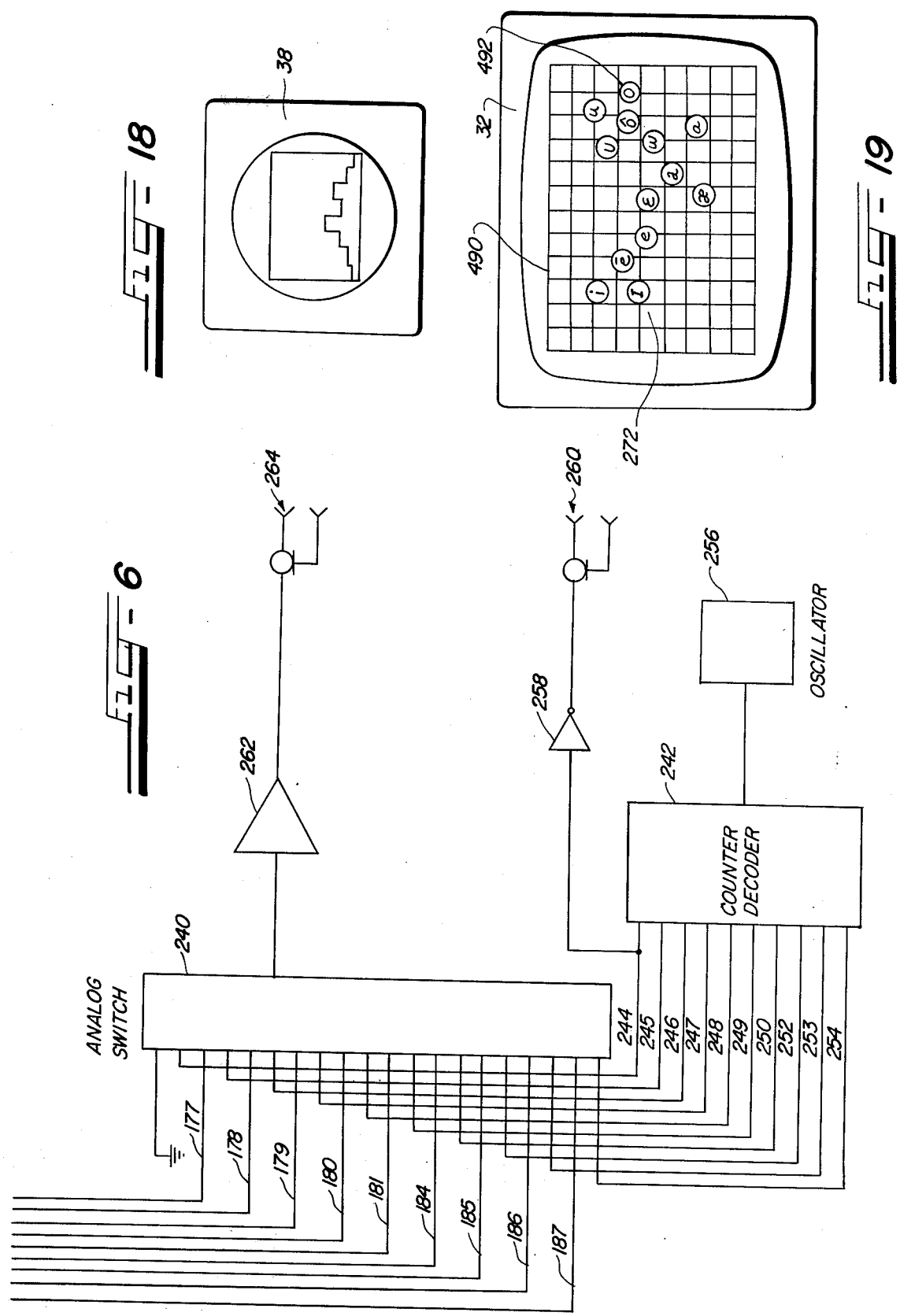
FIG. 6 is a more detailed block diagram of the formant spectrum display circuit of the present invention.

As previously indicated with respect to FIG. 3, each of conductors 177–181 and 184–187 carries a DC signal representative of the value of the amplitude of the output of each of band pass filters 167–175. With reference to FIG. 3, 4, and 6, it can be filters 167–175. With reference to FIG. 3, 4, and 6, it can be seen that these output signals from the detector comparator circuits 88–98 are conducted to an analog switch 240. Sequential DC logic signals are provided by a counter-decoder 242 to analog switch 240 on conductors 244–254. Counter decoder 242 is driven by an oscillator 256. As counter decoder 242 counts, a logic signal first appears on conductor 244. This signal is fed to an inverter 258 and then to the input jack 260 of the external sync control of oscilloscope 38. A logic signal next appears on conductor 245 which causes analog switch 240 to pass the DC signal present on conductor 177 to amplifier 262. The output of amplifier 262 is connected to the vertical input jack 264 of oscilloscope 38. Counter decoder 242 then counts its next count and applies a logic signal along conductor 246 which causes the input on conductor 178 to be passed by analog switch 240 to amplifier 262 and then to the vertical input 264 of oscilloscope 38. Similarly, logic signals are applied in sequence on the remaining conductors 247–254 so that each of the DC signals present on conductors 177–178 are sequentially applied to the input of the oscilloscope. This permits a bar graph representation of the magnitude of the respective band pass filter channels to be displayed on the oscilloscope screen much like that illustrated in FIG. 18.

Figure 7:
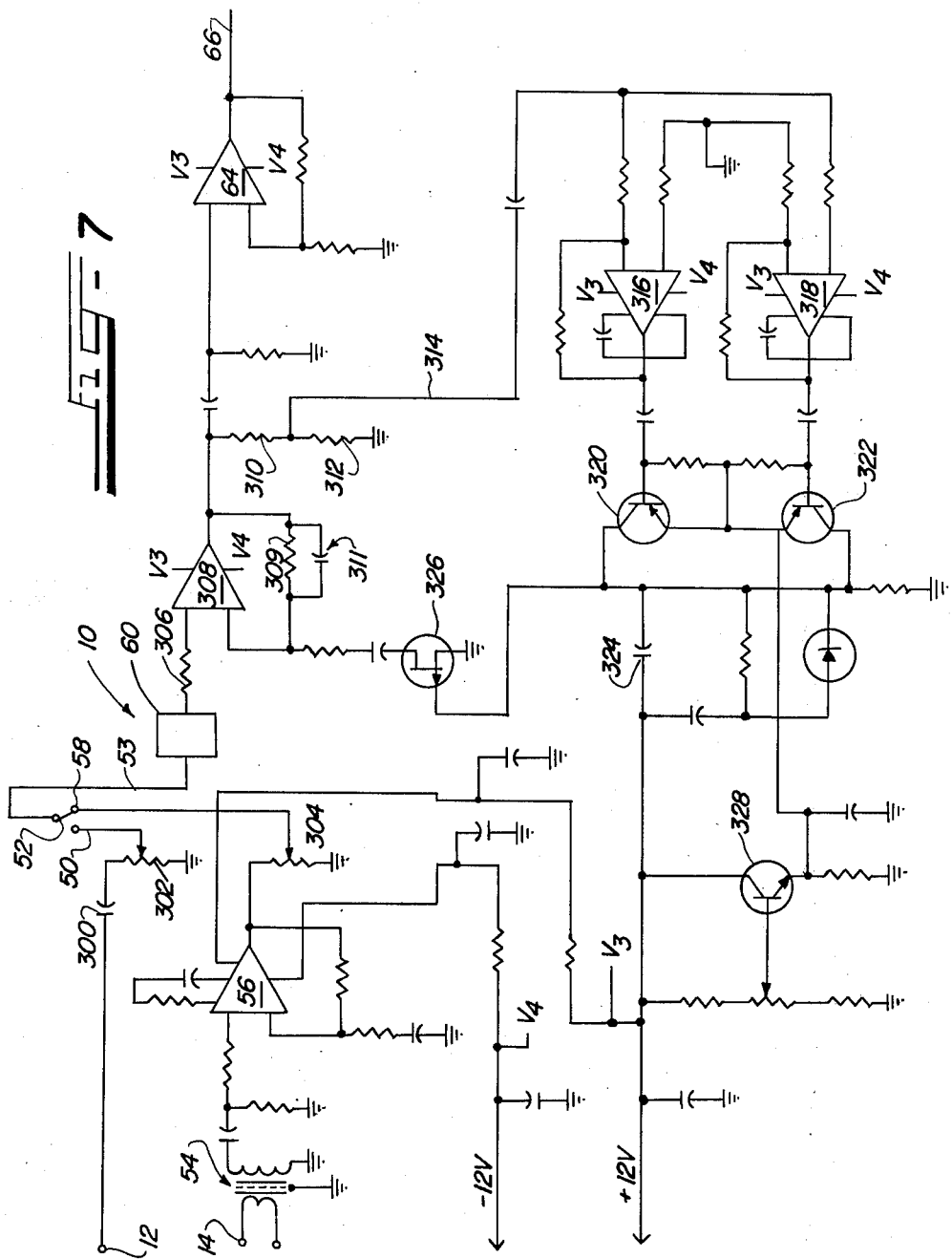
FIG. 7 is a detailed circuit diagram of the input amplifier, filter, and peak limiter circuit of the present invention.

With reference to FIG. 7, a more detailed circuit diagram is illustrated of the input amplifier, filter, and peak limiter circuit 10 illustrated in FIGS. 1 and 2. High level input 12 is connected through a capacitor 300 and a trim pot 302 to contact 50 of selector switch 52. Similarly, low level input 14 is connected through transformer 54 to the input of integrated circuit amplifier 56 which is a conventional commercially available integrated circuit known as a Type MuA739 Dual Preamp. chip sold by Fairchild Semiconductor Corp. The output of amplifier 56 is connected to a trim pot 304 which in turn is connected to contact 58 of selector switch 52. Trim pots 302 and 304 permit balancing of the input signals. Switch 52 is connected by conductor 55 to high pass filter 60 which in turn is connected through a resistor 306 to one input of amplifier 308. High pass filter 60 is a conventional commercially available integrated filter circuit. The output of amplifier 308 (which is a Type MuA741 operational amplifier integrated circuit sold by Fairchild Semiconductor) is grounded through voltage divider resistors 310 and 312 and the divided voltage is tapped off by conductor 314 and applied in parallel to two operational amplifiers 316 and 318 (Type N5558V Dual Operational Amplifier integrated circuit sold by Signetics Corp.). The two operational amplifiers 316 and 318 are provided because the peak signal may be more negative than positive or vice versa and accordingly, both the positive and negative peak signals must be sensed. Operational amplifiers 316 and 318 act as push-pull amplifiers to control transistors 320 and 322 respectively. Transistors 320 and 322 are normally biased off, but when the output of either operational amplifier 316 or 318 exceeds a predetermined peak signal, a corresponding transistor 320 and 322 is turned on to rapidly discharge capacitor 324. This causes transistor 326 to act as a variable resistor to limit the gain of amplifier 308. Transistor 328 is provided to introduce a slight delay in the recharging of capacitor 324 after the peak signal is sensed. It should be recognized that this peak limiter circuit operates in a conventional manner to limit the peak output signal from amplifier 308. The signal is then applied to amplifier 64 which amplifies the signal on output 66. As pointed out previously, the signal on conductor 66 is applied in parallel to the band pass filters 67–75.

Figure 8:
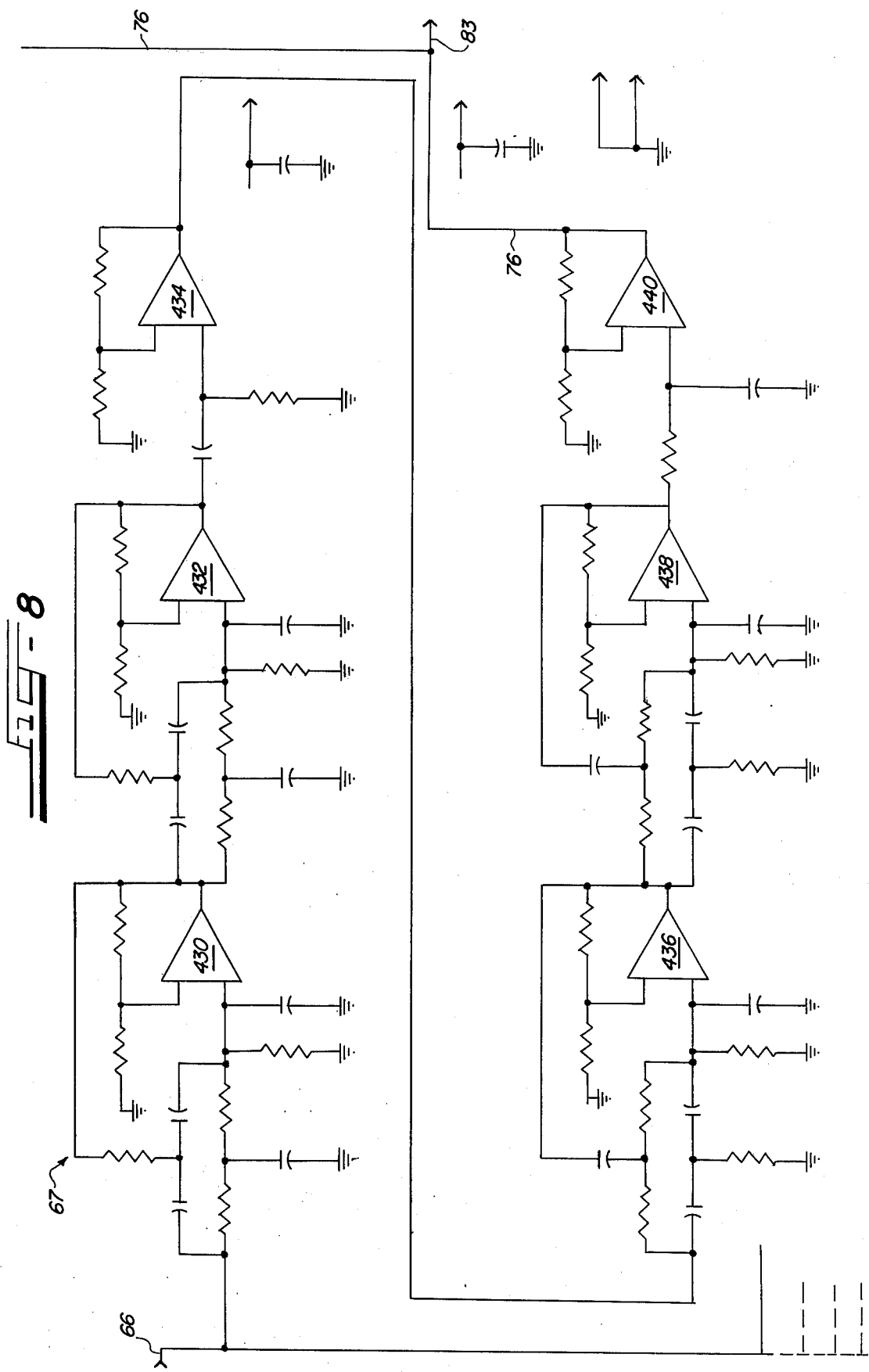
FIG. 8 is a detailed circuit diagram of one of the nine band pass filters of the present invention.

FIG. 8 is a detailed circuit diagram of one band pass filter such as band filter 67, but it should be understood that each of the band pass filters 68–75 is substantially the same but component values are changed to achieve the band pass filter function at different frequencies. Band pass filter 67 is of well known conventional design and will be readily understood by one skilled in the art. It comprises a set of cascaded integrated circuit amplifiers 430, 432, 434, 436, and 440 (Fairchild Type MuA741) coupled by resistor-capacitor networks which achieve the band pass filtering function in a conventional manner. The output of band pass filter 67 is conductor 76 and 83 as previously described.

Figure 9:
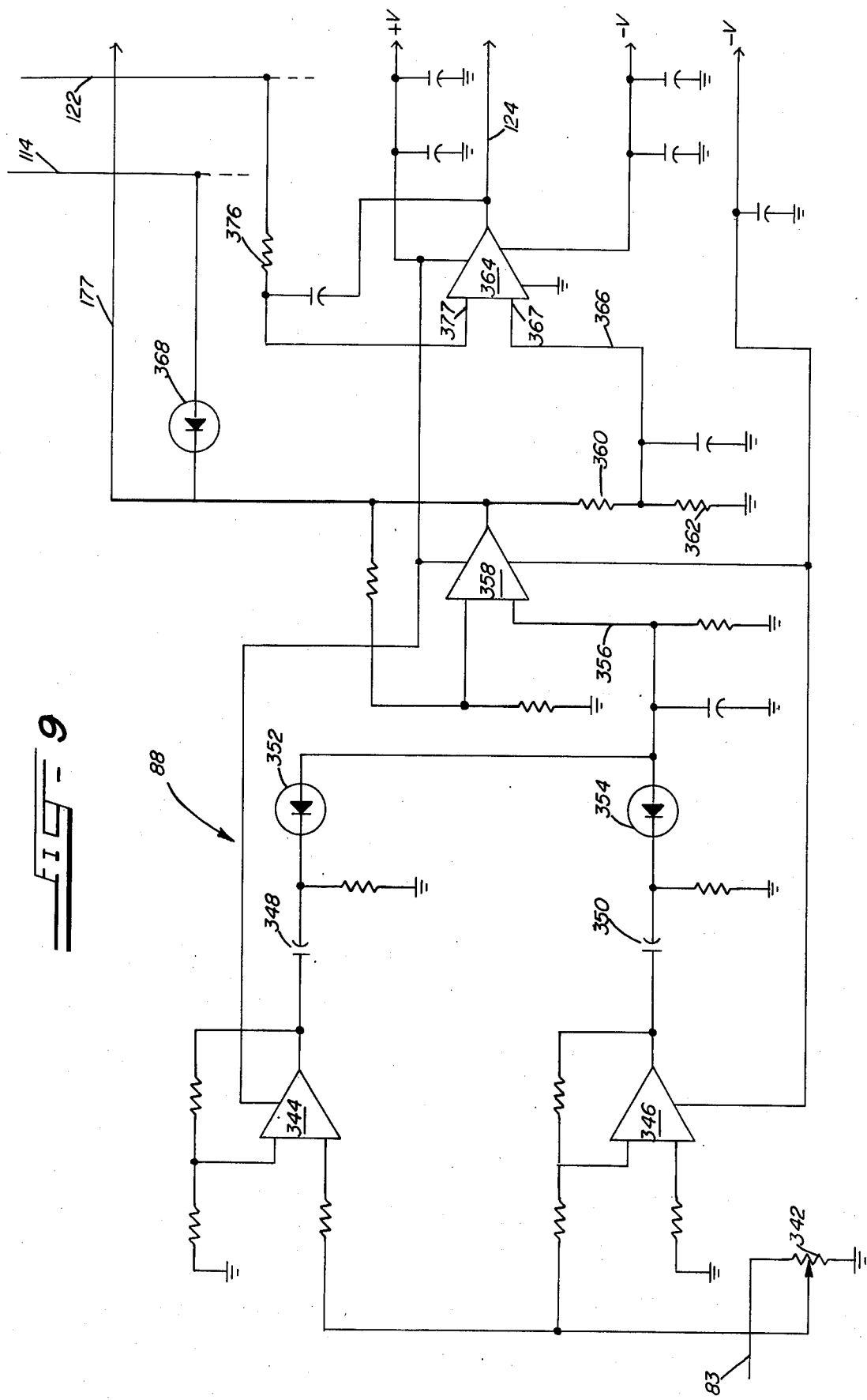
FIG. 9 is a detailed circuit diagram of one of the detector-comparator circuits of the present invention.

With reference to FIG. 9, one of the detector-comparator circuits 88–98 is illustrated. For purposes of discussion, it will be assumed that detector comparator circuit 88 is illustrated. The input on conductor 83 is applied through a trim pot 342 to the input of integrated circuit amplifiers 344 and 346 (Type N5558V dual operation amplifier integrated circuit sold by Signetics) which act as conventional push-pull amplifiers. The output of amplifiers 344 and 346 are respectively connected through capacitors 348 and 350 to the cathodes of diodes 352 and 354. Diodes 352 and 354 rectify the audio signal so that a DC voltage representative of the magnitude of the input audio signal is applied on conductor 356 to the input of an integrated circuit DC amplifier 358 (Fairchild Type MuA741). The output of DC amplifier 358 is a negative voltage and is connected to ground through resistors 360 and 362. These resistors are of equal value and act as a voltage dividers to divide the output voltage by one half. The divided voltage is applied to one input 367 of a comparator 364 (Type Mu A710 different voltage comparator intergrated circuit sold by Fairchild Semiconductor) through conductor 366. The output DC amplifier 358 is also connected through diode 368 to bus conductor 114 connected to buffer amp 118 as previously described with respect to FIG. 3. The output of amplifier 358 is also connected to conductor 177 which as previously described is connected to the formant spectrum display circuit 36 is illustrated in FIG. 6.

Figure 10:
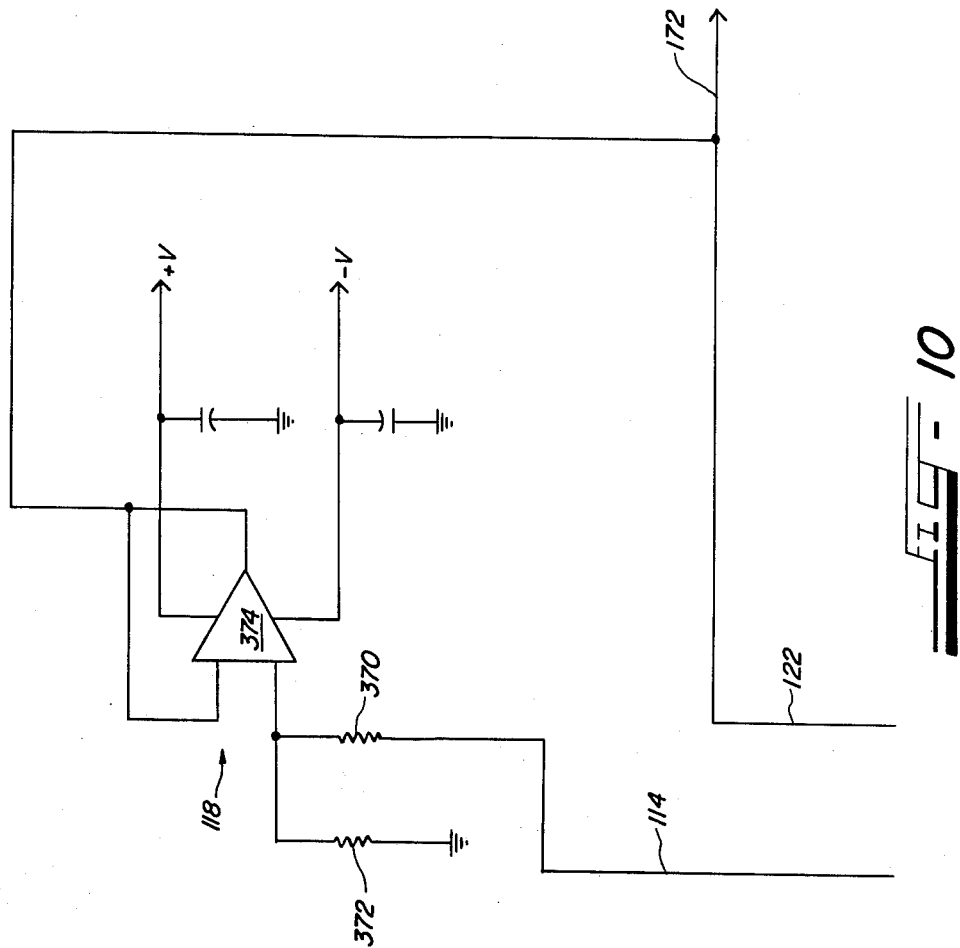
FIG. 10 is a detailed circuit diagram of the compare bus buffer of the present invention.

With reference to FIG. 10, the buffer amplifier circuit 118 previously described with respect to FIG. 3 is more fully illustrated. Since there is a diode such as diode 368 in each of the detector comparators 88–98 (see FIG. 9) all of which are connected in parallel to bus conductor 114, only the output from one of the DC amplifiers such as the DC amplifier 358 in each of the detector circuits 88–98 having maximum negative voltage will bias the respective diode 368 to conduct so that only the maximum negative output voltage from the DC amplifiers of any of the detector-comparators 88–92 will appear on bus 114. With reference to FIG. 10, bus 114 is connected through a voltage divider network comprising resistors 370 and 372 to the input of integrated circuit amplifier 374 (Fairchild Type MuA741 integrated circuit). Amplifier 374 is a high input impedance device which serves an isolation function. Resistors 370 and 372 are of equal value to provide a one-half voltage division corresponding to the division by resistors 360 and 362 in FIG. 9. The output of amplifier 374 is connected to feedback bus conductor 122 and to conductor 172 is connected to the signal operated relay 40 as previously described. The DC voltage on bus conductor 122 is applied through a resistor 376 to the other input 377 of comparator 364. If the voltage on input 367 of comparator 364 is equal or greater than the input voltage on input 377, comparator 364 operates to supply an output DC logic signal on conductor 124. If the voltage on input 367 is less than the voltage on input 377, comparator 364 does not operate to supply an output voltage. Only one of the comparators in the detector-comparators 88–92 will put an output DC logic signal. This DC logic signal on conductor 124 is applied to the one input of analog switch 82 in FIG. 11 (as previously described with respect to FIG. 3).

Figure 11:
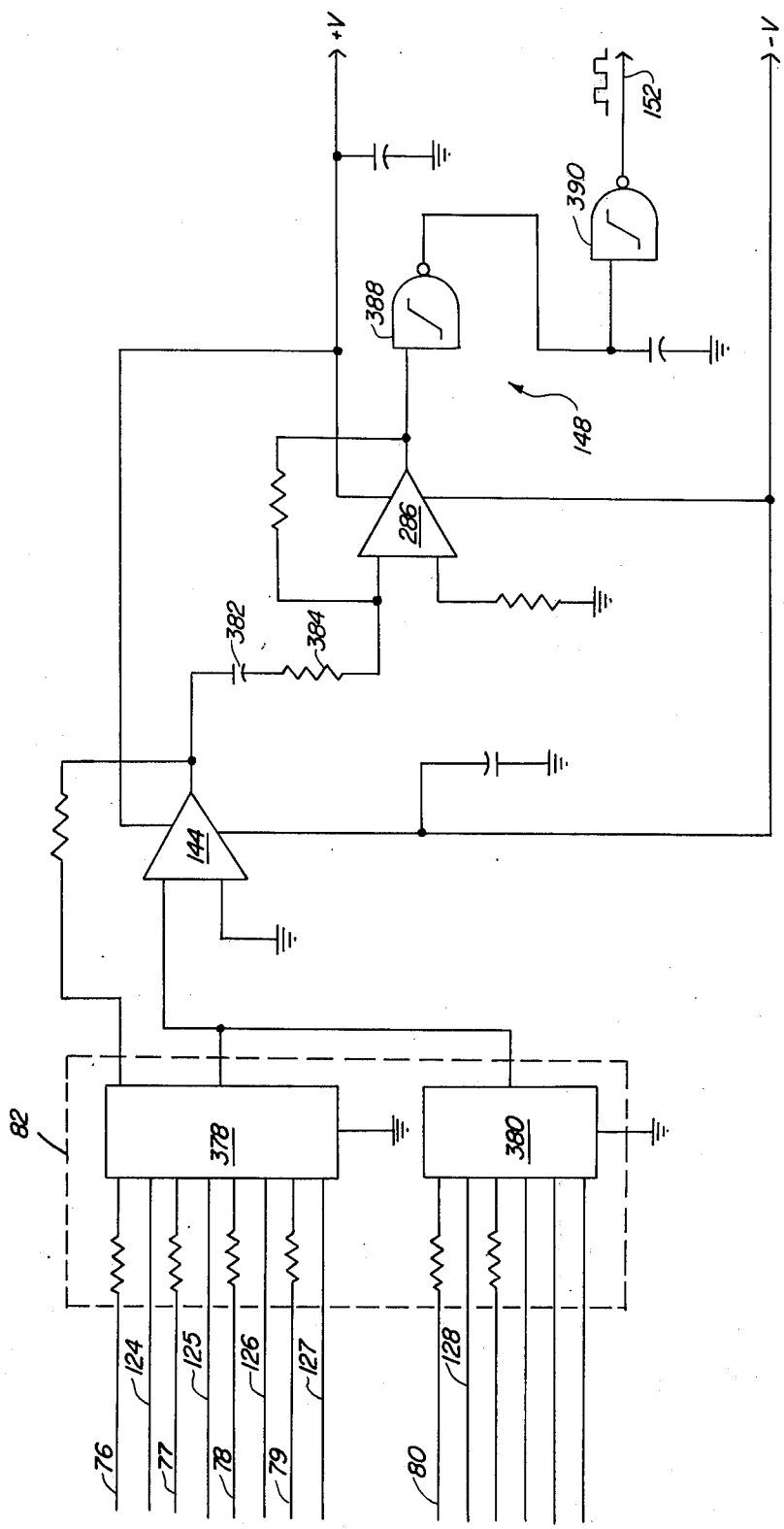
FIG. 11 is a detailed circuit diagram of the digitally controlled analog switch circuit of the present invention.

With reference to FIG. 11, analog switch 82 comprises two integrated circuit 378 and 380 (Type IH5010 4 channel analog switch and Type IH5014 3 channel analog switch respectively, sold by Intersil, Inc.). It should be understood that the circuit illustrated in FIG. 11 corresponds to either of the analog switches 82 or 104. The principal difference is that in analog switch 104, an additional pair of leads are necessary since analog switch 104 has six pairs of input leads whereas analog switch 82 has five pairs of input leads. Otherwise, analog switches 82 and 104 are identical.

With a DC logic signal on input lead 124, the AC signal on conductor 176 from Band pass filter 67 is conducted by integrated circuit 378 to integrated circuit amplifier 144 (Fairchild Type Mu A741). The output of amplifier 144 is connected through capacitor 382 and resistor 384 to the input of integrated circuit amplifier 386 (Fairchild Type Mu A741). The output of amplifier 386 is applied to a serial combination of Schmitt trigger circuits 388 and 390 (Texas Instruments Type 7413 Dual Nand Schmitt trigger circuit) which operate to convert the audio signal from amplifier 386 to a corresponding square wave signal of the same frequency. These Schmitt trigger circuits effectively operate as a zero crossing circuit to produce the square wave output at the same frequency as the input signal. Thus, amplifier 386 and Schmitt triggers 388 and 390 comprise zero crossing circuit 148 in FIG. 3. However, it should be understood that analog switch 82, amplifier 144, and zero crossing circuit 148 illustrated in FIG. 11 are substantially identical to analog switch 104, amplifier 146 and zero crossing circuit 150 illustrated in FIG. 3.

Figure 14:
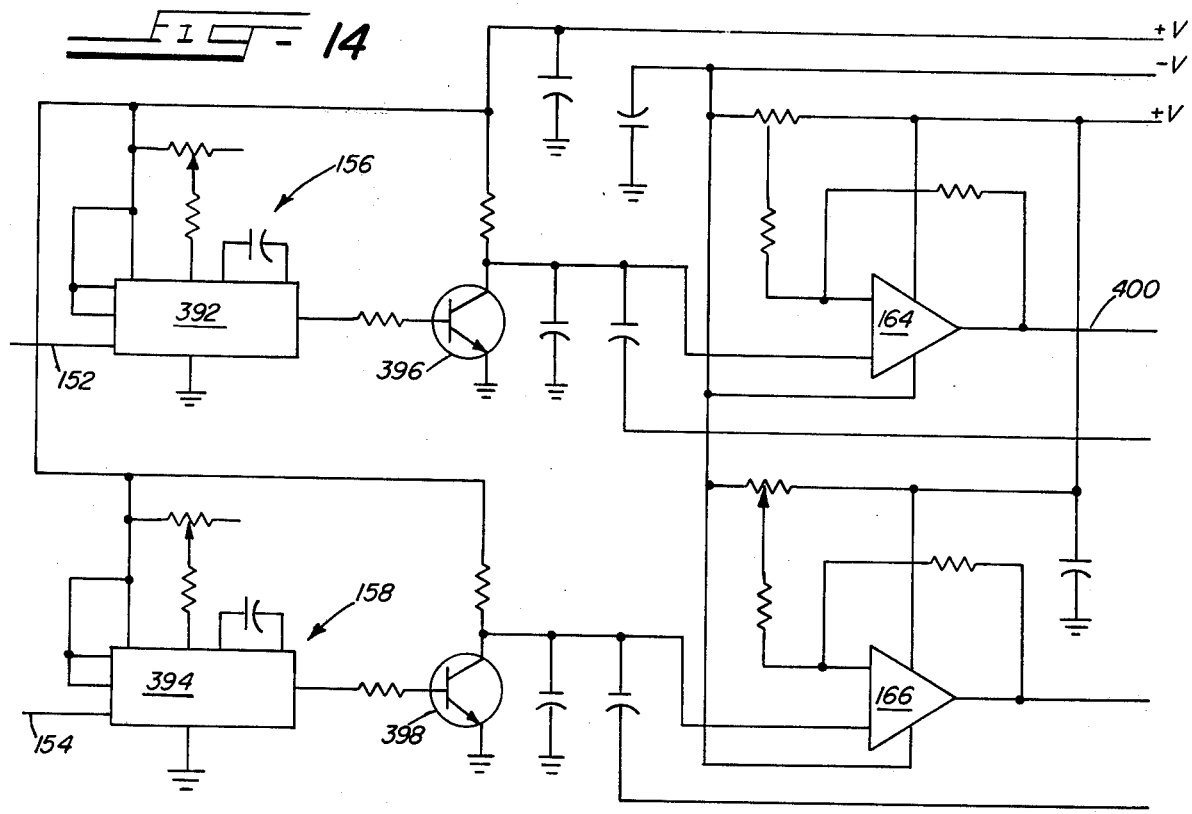
FIG. 14 is a detailed circuit diagram of the frequency to voltage converter circuits of the present invention.

The square wave output on conductor 152 is applied to monostable multivibrator 156 in FIG. 14 which comprises a conventional integrated circuit 392 (Texas Instrument Type 74121 monostable multivibrator). Similarly, the square wave input from zero crossing circuit 150 is connected by conductor 154 to monostable multivibrator 158 which comprises an integrated circuit 394 (Texas Instruments Type 74121). As previously explained, monostable multivibrator 156 provides at its output a constant voltage and fixed width pulse whose period is determined by the frequency of the input square wave. The output pulse of monostable multivibrator 156 and 158 are integrated by transistor stages 396 and 398 respectively and this integrated voltage is applied to the input of integrated circuit amplifiers 164 and 166 (Fairchild Type MuA741) respectively. The output of amplifiers 164 and 166 are respectively applied to deflection amplifiers 28 and 30 as illustrated in FIG. 4 (and to be more fully described below with respect to FIG. 15) to drive the horizontal and vertical deflection yokes 168 and 170 of cathode ray tube 32.

Figure 15:
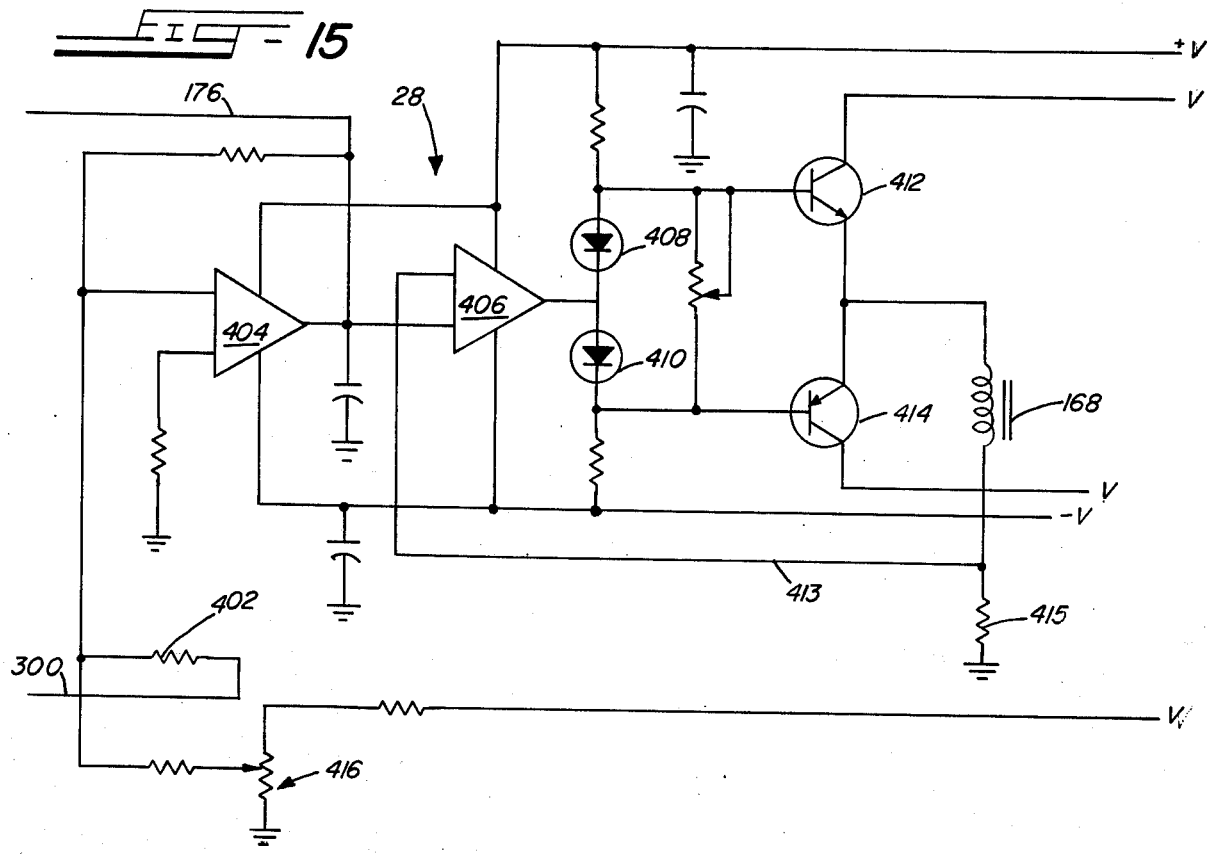
FIG. 15 is a detailed circuit diagram of one of the cathode ray tube deflection amplifier circuits of the present invention.

With reference to FIG. 15, a deflection yoke amplifier circuit is hereby fully illustrated. For purposes of discussion, it will be assumed that FIG. 15 illustrates deflection amplifier 28. Accordingly, the output from amplifier 164 (in FIG. 14) on conductor 400 is applied through a resistor 402 to the input of an integrated circuit amplifier 404 (Fairchild Type MuA741). The output of amplifier 404 is applied to the input of integrated circuit amplifier 406 (Fairchild Type MuA741) for further amplification. The output of amplifier 406 is connected to the junction of diodes 408 and 410 which serve to prevent crossover distortion. The anode of diode 408 is connected to the base of transistor 412 and the cathode of diode 410 is connected to the base of transistor 414. A resistor 415 is connected from the feedback loop 413 to ground to increase linearity. This deflection amplifier 28 is of conventional design and as will be recognized by those skilled in the art, the magnitude of the input signal on 400 is amplified so that a corresponding current is caused to flow through deflection yoke 168 to cause the electron beam to deflect by an amount corresponding to the magnitude of the signal from amplifier 164. A trim pot 416 is provided to adjust the position of the electron beam when no signal is present. Conductor 176 is connected to the signal operated relay 40 as previously described with respect to FIG. 4. When signal operated relay 40 is in its unoperated condition in the absence of an input signal, lead 176 is grounded so that there can be no input to amplifier 406. This effectively turns off deflection amplifier 28 so that circuit and room noise cannot cause the amplifier to operate thereby preventing unnecessary heating of the deflection yokes and associated components.

Figure 12:
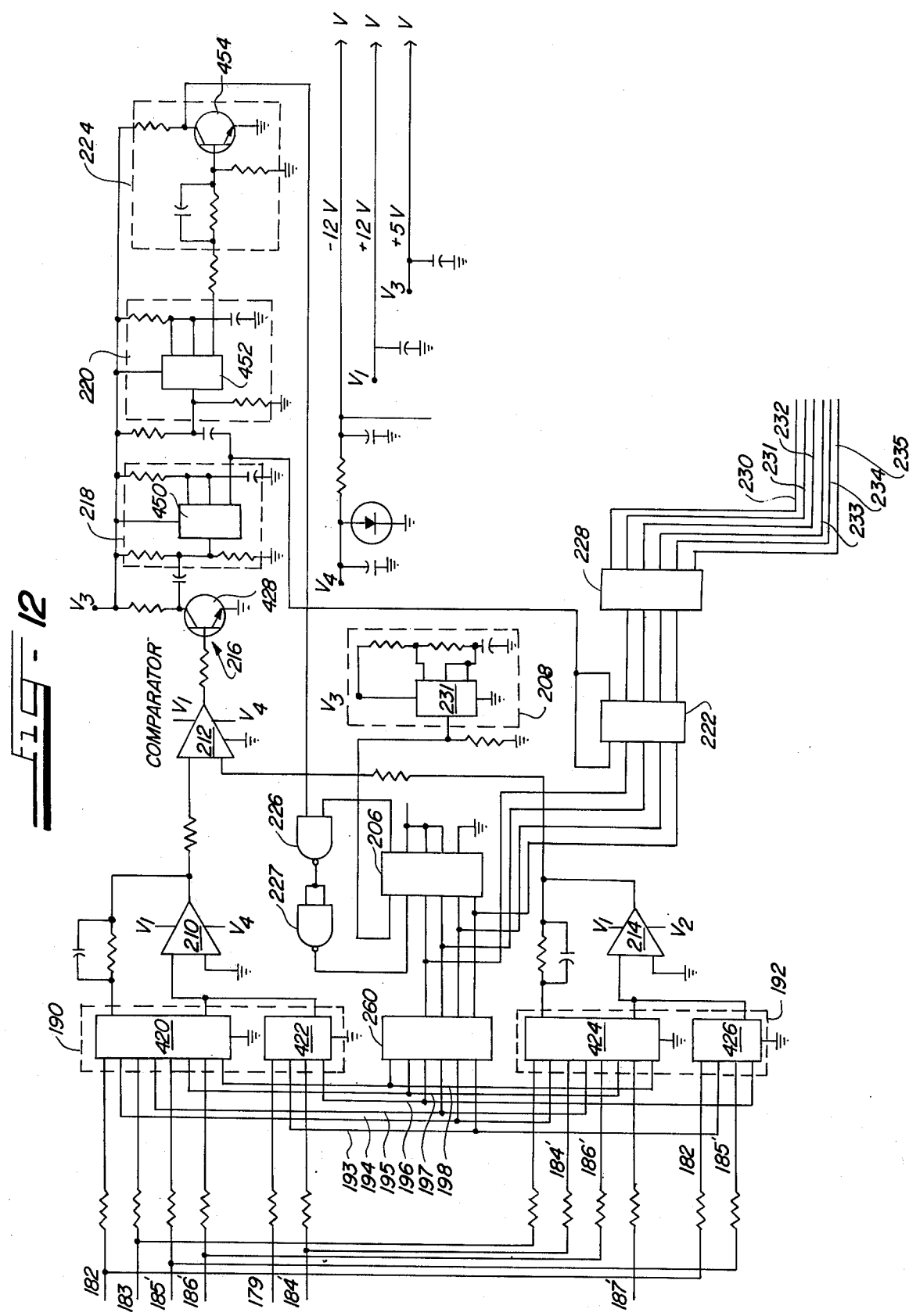
FIG. 12 is a detailed circuit diagram of the scanning second formant selector circuit of the present invention.

With reference to FIG. 12, a more detailed circuit diagram of the scanning second format selector circuit 34, illustrated in block diagram form in FIGS. 1 and 5, is illustrated. Analog switch 190 comprises two integrated circuits 420 and 422 and analog switch 192 comprises two integrated circuits 424 and 426. Integrated circuits 420 and 424 are Intersil Inc. Type IH5010 four-channel analog switches, and integrated circuits 422 and 426 are Intersil Type IH5018, three-channel analog switches. Decoder 200 is BCD to DECIMAL decoder integrated circuit Texas Instrument Type 7442, and up-down counter 206 is a Texas Instrument type 74192 integrated circuit. Oscillator 208 similarly comprises a free running oscillator integrated circuit 231, sold by Signetics as Type NE-555V. Amplifiers 210 and 214 are also Fairchild Type MuA741 integrated circuit operational amplifiers. Comparator 212 is a Fairchild Type Mu A710 differential voltage comparator integrated circuit. Inverter 216 comprises a transistor 428 which operates to invert the output signal from comparator 212. One shot multivibrators 218 and 220 comprises integrated circuits 450 and 452 respectively which are Intersil Type Ne555V integrated circuits. Inverter 224 comprises a transistor 454 which inverts the output signal from one shot multivibrator 452. Four-bit latch 222 comprises an integrated circuit which is a Texas Instrument Type 7475 quadruple bistable latch, and decoder 228 comprises an integrated circuit which is a Texas Instruments Type 7442 BCD to DECIMAL decoder. The circuit illustrated in FIG. 12 operates in the same manner as that described with respect to FIG. 5 to provide an output logic signal on one of leads 230

—235 to the selector circuit 141 so that the appropriate highest frequency peak signal is transmitted to the analog switch 104.

Figure 13:
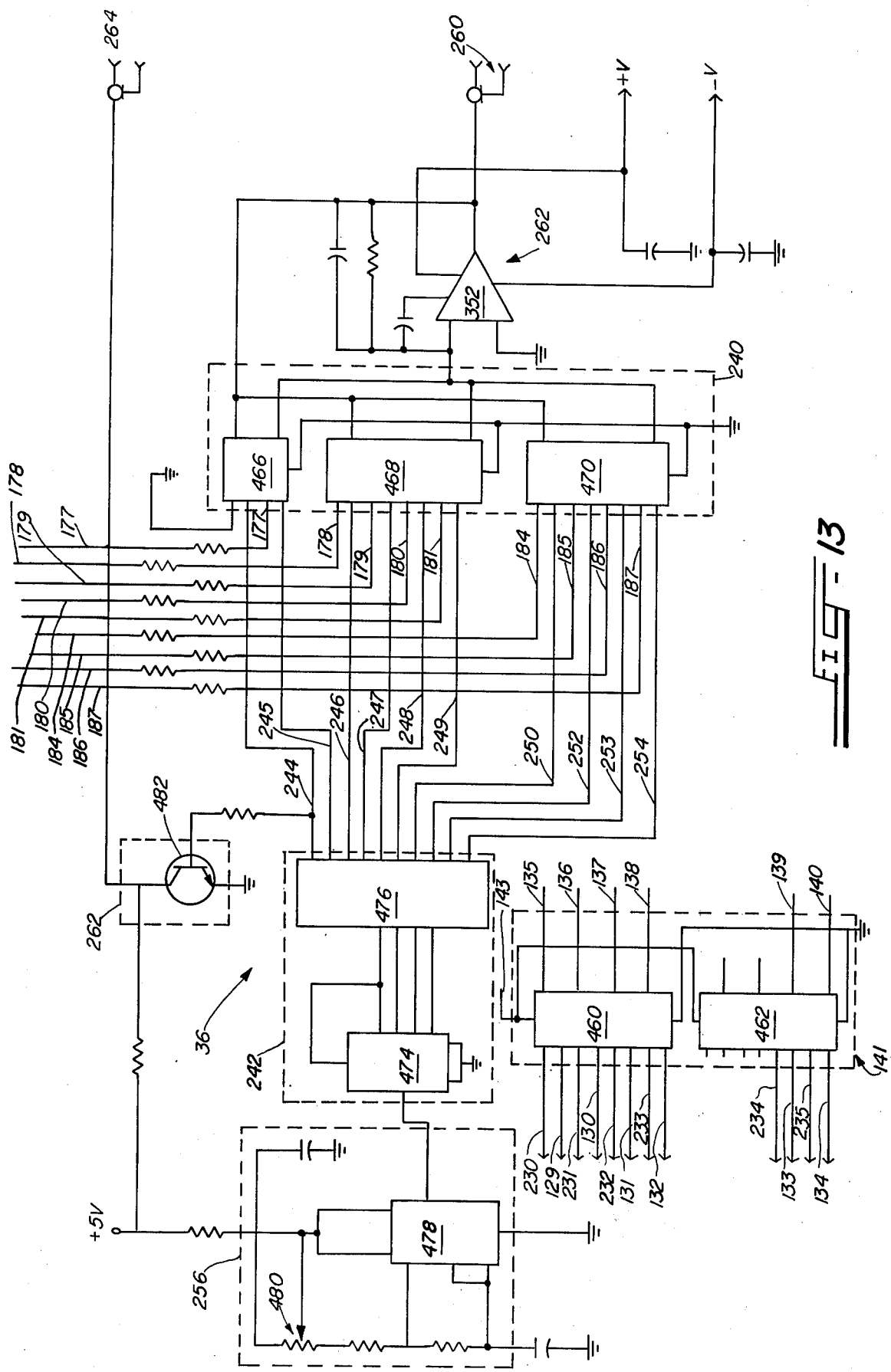
FIG. 13 is a detailed circuit diagram of the formant spectrum display circuit of the present invention.

With reference to FIG. 13, the formant spectrum display circuit 36 is more fully illustrated. Input leads 177-187 are connected to the inputs of analog switch 240 which comprises integrated circuits 466, 468 and 470. Integrated circuit 466 is an Intersil Type IH5018 two channel analog switch, and integrated circuits 468 and 470 are Intersill Type IH5010 four-channel analog switches. Amplifier 262 comprises an integrated circuit amplifier 352 type LM 301A operational amplifier sold by National Semiconductor.

Counter decoder 242 comprises two integrated circuits 474 and 476. Integrated circuit 474 is a Texas Instruments Type 7490 integrated counter circuit, and integrated circuit 476 is Texas Instruments Type 7442 BCD to DECIMAL decoder circuit. Oscillator 256 comprises an integrated oscillator circuit 478 Signetics Type NE555V. Oscillator 256 further comprises a potentiometer 480 which is provided to allow frequency adjustment of the oscillations of oscillator 256. Inverter 262 comprises a transistor 482 having a base connected to lead 244. Without a signal on the base of transistor 262, transistor 262 is non-conducting so that five volts appears at the sync input 264 of the oscilloscope. However, when a logic signal appears on conductor 244 as the counter 476 counts, transistor 482 is turned on grounding the sync output 264 to the oscilloscope 38 providing the appropriate sync signal. The formant spectrum display circuit 36 illustrated in FIG. 13 operates in the same manner as previously described with respect to FIG. 6 to provide a time versus amplitude display in bar graph form of the amplitudes of the respective formant channels.

With reference to FIG. 16, the front display panel of the present invention is illustrated. Cathode ray tube 32 can comprise a conventional television tube having a grid arrangement 490 overlying the face of the tube. With more specific reference to FIG. 19, the position of the electron beam when various vowel sounds are pronounced or sung can be predetermined by empirical methods and stickers 492 can be placed on the face of the cathode ray tube at a position corresponding to the proper position of the electron beam when the vowel sound is properly pronounced or sung. The student then sings or pronounces the selected vowel sound and observes the position of the electron beam on the face of the cathode ray tube. If the electron beam aligns with the corresponding sticker 492, the student knows that he is properly pronouncing or singing the vowel sound. If the electron beam does not align with the corresponding sticker 492, the student adjusts his pronunciation by changing his tongue position until the electron beam does align with the corresponding sticker 492. At the same time, oscilloscope 38 displays in bar graph form the amplitude of the respective formant channels. With reference to FIG. 18, a representative bar graph is illustrated.

Since the present invention measures changes in timber as well as acoustic position of preferred vowel sounds, the instrument will find its greatest use at teaching of voice in placing of vocalized sounds in two ways. First, the singer may match his sung sound with predetermined preferred vowel positions chosen by professional teachers and singers. These positions will include the proper timber and migration points for all vowels sung on all pitches in all intensity levels. Second, the student may place a phonetic symbol such as sticker 272 in any position on the display that he believes to be the best phonetic position for that particular student considering both pitch and loudness.

The present invention may also be used as a tool for visual identification of vowel positions for the deaf. The ability of the teacher and students to sense the slightest movement of the articulators moving the dot of light to a preferred area for each vowel on the face of the cathode ray tube provides a training device that will hasten speech sensations and vowel identification for those afflicated with loss of hearing.

The present invention may also be used in courses in experimental phonics, diction, and speech courses where the instantaneous or visual recognition of a vowel is needed. Presently, all vowel identification is made or aural recogniation by the time consuming process of making sonograms of each sound which is limited to 2.4 second duration on a two-dimensional graph. The present invention may also be used for linguistic research where dialectic characteristics are being compared with language. The approximation of the luminescent dots to the fixed acoustical cardinal vowels of Daniel Jones or Appleman, Acoustic Standards of Sung Vowels could be instantaneously observed and compared.

The present invention may also be used for linguistic research where written language is to be formed from footages of taped tribal sounds where the instantaneous recognition of the utterances is needed.

Since the luminescent dot moves as the tongue, pharnyx, and oral cavity change, the present invention could be used in courses of voice science on both undergraduate and graduate levels where the examination of phonary process is observed and measured, where cavity coupling is observed and measured, where formant areas are to be determined and where physiological changes such as pharyngeal and laryngeal or oral criteria are observed and measured.

Further, the present invention may be used in blending sections in choral singing due to the unification of identical vowel sounds for attaining blend. Such training is conceptual, due to the transfer of variable phonemes to vocalized sound. Here the blend would be instantaneously recognizable visually, upon its consummation.

The present invention also has the advantage of being easily miniaturized and usable in connection with a standard television set. Accordingly, a relatively small package containing the basic circuitry could be attached to a standard television set so that the present invention could be utilized both at home by the student as well as in any classroom having television facilities.

With these advantages and features in mind, it should be apparent that various changes, alterations, and modifications may be made to the preferred embodiment of the present invention as described herein, without departing from the spirit and scope of the present invention as defined in the appended claims.

We claim:

1. A device for visually displaying the auditory content of the human voice comprising:
    input means for receiving human voice utterances and for converting the auditory content of the voice utterances to an electronic audio signal having a frequency spectrum;
    a first set of filter means covering a first formant frequency range of the frequency spectrum of the voice utterances for separating the electronic audio signal into a first set of individual frequency signals;

a second set of filter means covering a second formant frequency range of the frequency spectrum of the voice utterances for separating the electronic audio signal into a second set of individual frequency signals;

first comparator means for comparing the first set of individual frequency signals and selecting and transmitting the individual frequency signal of the first set having the greatest magnitude;

second comparator means for comparing the second set of individual frequency signals and selecting and transmitting the individual frequency signal of the second set having the greatest magnitude;

first converter means for converting the selected individual frequency signal from the first comparator means to a first voltage representative of the frequency of the selected frequency signal of the first set;

second converter means for converting the selected individual frequency signal from the second comparator means to a second voltage representative of the frequency of the selected frequency signal of the second set;

a display means including a cathode ray tube having a vertical input and a horizontal input, said first voltage from said first converter means being applied to said vertical input, and said second voltage from said second converter means being applied to said horizontal input so that a luminescent dot appears on the face of said cathode ray tube at a vertical and horizontal position corresponding to the values of said first and said second voltages.

2. A device, as claimed in claim 1, further comprising:
means for displaying in bar graph form the respective amplitudes of the individual frequency signals of the first and second sets of individual frequency signals.

3. A device, as claimed in claim 1, further comprising:
scanning selector means for scanning the second set of individual frequency signals, selecting the highest frequency peak signal and causing the peak signal to be transmitted to the second converter means.

4. A device, as claimed in claim 1, wherein said input means comprises:
a sound transducer for converting the human voice utterances into the electronic audio signal;
a first amplifier means connected to said microphone for amplifying the electronic audio signal;
a high pass filter means connected to the output of said amplifier means for filtering out the fundamental frequency of the electronic audio signal;
a peak limiter means connected to said high pass filter means for limiting the maximum amplitude of the electronic audio signal;
a second amplifier connected to the peak limiter means for amplifying the electronic audio signal.

5. A device, as claimed in claim 1, wherein said first and said set of filter means comprises a plurality of band pass filters.

6. A device, as claimed in claim 1, wherein said first and said second comparator means comprises a plurality of individual circuits each including:

rectifier means for converting each of the individual frequency signals to a corresponding DC voltage of comparable amplitude;

detector means for detecting the DC voltage of the respective rectifier means having the greater amplitude;

comparator means for comparing the detected DC voltage with the DC voltage from said rectifier means and transmitting a logic signal if said DC voltage is equal to or greater than the detected DC voltage; and switch means for passing the individual frequency signal corresponding to the transmitted DC logic signal.

7. A device, as claimed in claim 1, wherein said first and said second converter means each comprise:
zero crossing circuit means for converting the selected individual frequency signal to a square wave signal of the same frequency;
monostable multivibrator means for converting said square wave signal to pulses having a width corresponding to the frequency of said square wave signal;
integrator means for integrating said constant voltage pulse to provide a DC voltage signal proportional to the frequency of the selected individual frequency signal.

8. A device, as claimed in claim 1, wherein said display means comprises:
a vertical deflection amplifier means for receiving said first voltage and providing an output current corresponding to said first voltage;
a horizontal deflection amplifier means for receiving said second voltage and providing an output current corresponding to said second voltage;
a vertical deflection yoke for said cathode ray tube connected to said vertical deflection amplifier means;
a horizontal deflection yoke for said cathode ray tube connected to said horizontal deflection amplifier means;
whereby the position of said luminescent dot is controlled by said output currents passing through said vertical and horizontal deflection yokes supplied by said vertical and horizontal deflection amplifiers.

9. A device, as claimed in claim 1, further comprising means for rendering said display means inoperative in the absence of said input means receiving human voice utterances.

10. A device, as claimed in claim 1, wherein said means for rendering said display means inoperative comprises a signal controlled relay that terminates electrical power to said display means when the electronic audio signal is absent.

11. A device for visually displaying the auditory content of the human voice comprising:
a sound transducer for receiving human voice utterances and converting the human voice utterances to an electronic audio signal having a frequency spectrum;
a high pass filter means for filtering out a fundamental frequency of the frequency spectrum of said electronic audio signal;
a peak limiter means for limiting the maximum amplitude of said electronic audio signal;
a plurality of band pass filter means for dividing said frequency spectrum into a corresponding plurality of individual frequency signals each having a frequency range corresponding to a section of said frequency spectrum;

a plurality of comparator means each for receiving one of said individual frequency signals and converting said individual frequency signals to a corresponding DC voltage of comparable amplitude, said plurality of comparator means being arranged to provide a first and second logic signal corresponding to the individual frequency signals in a first and a second overlapping formant range corresponding to the individual frequency signal in each formant range having the greatest amplitude;

a first switch means for receiving said first logic signal and transmitting said individual frequency signal in said first formant range having the greatest amplitude corresponding to said first logic signal;

a second switch means for receiving said second logic signal and transmitting said individual frequency signal in said second formant range having the greatest amplitude corresponding to said second logic signal;

a first converter means for converting said transmitted individual frequency signal in the first formant range to a first voltage signal having an amplitude representative of the frequency of said signal;

a second converter means for converting said transmitted individual frequency signal in the second range to a second voltage signal having an amplitude representative of the frequency of said signal;

a display means including a cathode ray tube for receiving said first and second voltage signals and deflecting an electron beam on the face of said cathode ray tube to a position corresponding to the frequency of said individual frequency signals.

12. A device, as claimed in claim 11, wherein said comparator means comprises:

rectifier means for converting said individual frequency signals to a DC rectified voltage of comparable amplitude;

detector means for detecting the DC voltage having the greatest amplitude in each of the two formant ranges;

comparator means for comparing the DC rectified voltage with the detected DC voltage and transmitting the logic signal identifying the individual frequency signal having the greatest amplitude when said rectified voltage is equal to or greater than said detected DC voltage.

13. A device, as claimed in claim 12, wherein said first and second switch means comprise analog switches that transmit the identified individual frequency signal upon receipt of the corresponding logic signal.

14. A device, as claimed in claim 13, wherein said first and second converter means for each comprise:

zero crossing circuit means for converting the transmitted individual frequency signal to a square wave signal of the same frequency;

monostable multivibrator means for converting said square wave signal to constant voltage pulse having a width corresponding to the frequency of said square wave signal;

integrator means for integrating said constant voltage pulses to provide a DC voltage having an amplitude porportional to the frequency of the transmitted individual frequency signals.

15. A device, as claimed in claim 11, further comprising means for rendering said display means inoperative in the absence of said sound transducer receiving human voice utterances.

16. A device, as claimed in claim 11, further comprising means for displaying in bar graph form the respective amplitudes of the plurality of individual frequency signals provided by said band pass filter means.

17. A device, as claimed in claim 11, further comprising:

scanning selector means for scanning said individual frequency signals in the second formant and selecting the peak individual frequency signal having the highest frequency and supplying a logic signal to said second switch means to cause said second switch means to transmit said selected peak individual frequency signal to said second comparator.

* * * * *